United States Patent [19]

Cobble

[11] Patent Number: 5,518,289
[45] Date of Patent: May 21, 1996

[54] WATERPROOF VEHICLE OR EQUIPMENT COVER WITH PASSIVE BAROMETRIC AIR-PUMP

[76] Inventor: Daniel L. Cobble, P.O. Box 2281, Oak Harbor, Wash. 98277

[21] Appl. No.: 385,733

[22] Filed: Feb. 8, 1995

Related U.S. Application Data

[63] Continuation of Ser. No. 45,670, Apr. 9, 1993, abandoned.

[51] Int. Cl.$^6$ ................................................ B60J 11/00
[52] U.S. Cl. .................. 296/136; 150/166; 160/370.21; 454/370; 135/93
[58] Field of Search .................. 296/95.1, 136; 150/166, 168; 160/370.2 R; 454/106, 114, 117, 145, 173, 270, 275, 276, 370, 903; 135/93, 94; 52/2.22, 2.23, 3; 138/118

[56] References Cited

U.S. PATENT DOCUMENTS

| | | | |
|---|---|---|---|
| 2,248,655 | 7/1941 | Bila | 135/94 X |
| 2,570,533 | 10/1951 | Elliott | 150/166 |
| 2,874,709 | 2/1959 | Cohen et al. | 296/136 X |
| 3,548,882 | 12/1970 | Rinker | 135/118 X |
| 3,970,096 | 7/1976 | Nicolai | 135/94 |
| 4,784,215 | 11/1988 | Sing | 160/370.2 R |
| 4,821,785 | 4/1989 | Rolan | 296/136 X |
| 4,825,889 | 5/1989 | Montieth | 296/136 X |
| 5,401,074 | 3/1995 | Timerman | 296/136 |

FOREIGN PATENT DOCUMENTS

| | | | |
|---|---|---|---|
| 2365978 | 4/1978 | France | 52/2.23 |
| 1264017 | 3/1968 | Germany | 454/270 |
| 25337 | 2/1977 | Japan | 296/136 |
| 1438973 | 11/1988 | U.S.S.R. | 296/136 |
| 1556939 | 4/1990 | U.S.S.R. | 296/136 |

OTHER PUBLICATIONS

Damp Vent Co., Mar. 27, 1952.

*Primary Examiner*—Dennis H. Pedder
*Attorney, Agent, or Firm*—Christensen, O'Connor, Johnson & Kindness

[57] ABSTRACT

A waterproof vehicle or equipment cover with passive barometric air-pump is disclosed and is characterized as having a flexible, fluid impervious first layer of material, a flexible, porous second layer of material sized to generally correspond to the first layer of material and attached thereto at the perimeter of the second layer to create an enclosed void defined by the first layer and the second layer, and a plurality of flexible tubes, each tube having a first open end and a second open end, and having a plurality of apertures defined thereby, wherein each tube is located in the void, in spaced apart relation, to thereby permit ingress of gaseous fluid from the first end of each tube to the void and egress of gaseous fluid from the void to the second end of each tube. When the cover is placed over the vehicle or equipment with the first layer exposed to ambient conditions and the second layer proximate to the vehicle or equipment, the cover will shelter the vehicle or equipment from ambient conditions and the perforated, open-ended tubes will utilize ambient pressure differentials to create a passive circulation of air into and out of the enclosed void and other isolated areas between the outer layer and the covered vehicle or equipment.

7 Claims, 5 Drawing Sheets

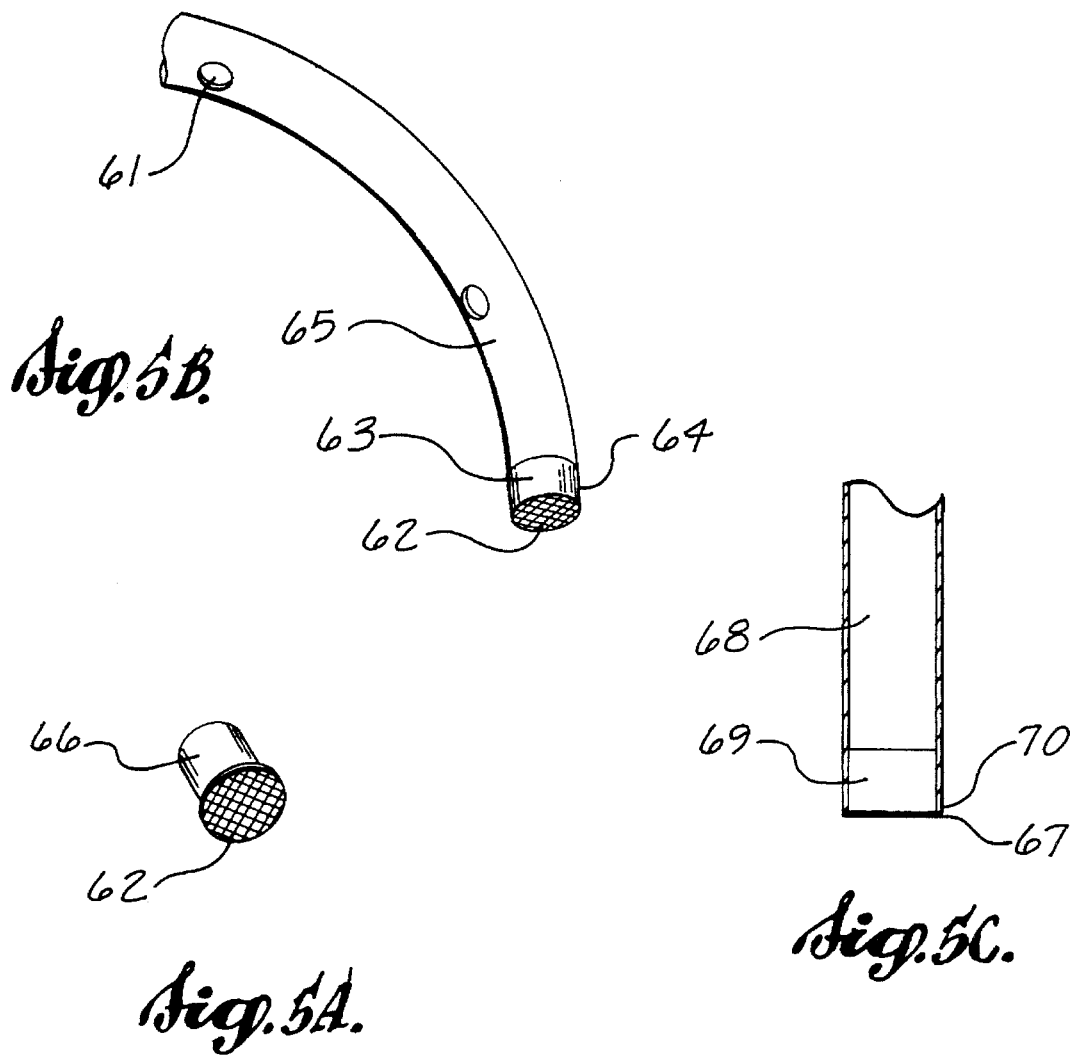

WATERPROOF VEHICLE OR EQUIPMENT COVER WITH PASSIVE BAROMETRIC AIR-PUMP

This application is a continuation application based on prior application Ser. No. 08/045,670, filed on Apr. 9, 1993 now abandoned.

FIELD OF THE INVENTION

The present invention relates generally to a temporary cover for vehicles and equipment that shields the same from penetration by moisture and solar radiation while permitting the migration of air residing between the cover and the vehicle or equipment to the surrounding environment.

BACKGROUND OF THE INVENTION

There has always been a need to protect property from the detrimental effects of the environment. Houses, buildings, and other permanent structures are the most common form for providing such protection. Permanent structures, however, do have certain drawbacks such as cost, the requirement for essentially permanent dedication of space, etc. When considering providing such protection for motor vehicles and equipment, either permanent structure or temporary covers are usually employed. It is desirable that either form of protection provide adequate insulation from ambient conditions such as moisture, radiation, and physical impact, and allow moisture and heat emanating from the vehicle or equipment to escape therefrom. In the field of vehicle and equipment covers, however, these desired objectives are often in competition: waterproof covers usually do not permit trapped air and moisture to escape from the isolated area between the cover and object while breathable covers do not completely protect the object from the environment.

SUMMARY OF THE INVENTION

The present invention pertains to a removable or temporary cover for motor vehicles and the like that provides protection from ambient conditions yet permits air circulation to otherwise isolated areas between the cover and the covered vehicle or equipment. The cover is characterized as having a flexible, fluid impervious first layer of material sufficient in size so as to cover substantially all surface area of the vehicle or equipment to be covered, a flexible, porous second layer of material generally coincident to the first layer of material and attached thereto at the perimeter of the second layer to create an enclosed void defined by the first layer and the second layer, and a plurality of flexible tubes disposed in the void, each tube having a first open end and a second open end and having a plurality of apertures defined thereby, wherein each tube is fixedly disposed intermediate the first layer and the second layer to thereby permit ingress of gaseous fluid from the first end of each tube to the enclosed void and egress of gaseous fluid from the enclosed void to the second end of each tube whereby placement of the cover over the vehicle or equipment with the first layer exposed to ambient conditions and the second layer proximate to the vehicle or equipment will shelter the vehicle or equipment from ambient conditions and permit migration of gaseous fluid to and from the isolated area defined by the first layer and the vehicle or equipment.

The nature and location of the flexible tubes create a barometric air pump. This passive gaseous fluid transport aspect of the invention permits the use of a completely fluid impervious outer cover layer to shelter the vehicle or equipment from the environment while avoiding the usually detrimental side effects associated with substantially enclosing a vehicle or equipment with such a cover, namely retention of trapped air between the cover and the vehicle or equipment. The barometric air pump relies on the pressure differentials which exist about nearly all objects exposed to ambient conditions. As air currents move about the surface of the earth, some are divergent from one area to another while others are convergent. These currents then create localized areas of relative high and low pressure. This effect is more pronounced in areas immediately adjacent to stationary objects (as opposed to an area free of objects). For example, a stationary object located in the path of an air current will experience a relatively high pressure zone on its windward side, and a relatively low pressure zone on it leeward side.

The barometric air pump utilizes this phenomenon by creating a fluid conduit between a relatively high pressure zone on one side of the covered vehicle or equipment and a relatively low pressure zone on another side of the vehicle or equipment. The fluid conduit created by the open-ended flexible tubes is not a closed system; the plurality of small apertures located throughout the length of each tube permits transported air to enter and exit the isolated area created between the first layer of the cover and the vehicle or equipment. Thus, the barometric air pump imparts a passive circulation of air in this space.

In preferred form, the cover utilizes a wholly waterproof outer layer having a major and minor axis and a correspondingly sized soft, fluid permeable inner layer attached at its outer perimeter thereto. A plurality of open-ended flexible tubes are disposed between the two layers in spaced apart fashion and are generally coaxial to the cover's minor axis so as to transverse a covered vehicle when the cover is placed thereon. The ends of each flexible tube preferably terminate at or just beyond the perimeter of the cover. Ideally, the perimeter of the cover should be located above the supporting surface of the covered vehicle or equipment.

The present invention effectively addresses the problems of car or equipment covers of the prior art by providing a completely waterproof outer covering while enhancing air flow in the isolated area between the car or equipment and the cover. In addition, the cover may be beneficially constructed from commercially available materials with minimal labor to thereby provide consumers with an excellent alternative to available technologies at an affordable price.

BRIEF DESCRIPTION OF THE DRAWINGS

FIG. 4b shows the air flow when ambient air pressure conditions are opposite to that shown in FIG. 4a;

FIG. 5a illustrates in perspective the placement of a strainer or filter in the end of a flexible tube used in the invention;

FIG. 5b is a cross sectional view of the strainer and tube of FIG. 5a; and

DETAILED DESCRIPTION OF PREFERRED EMBODIMENTS

Figure 1:
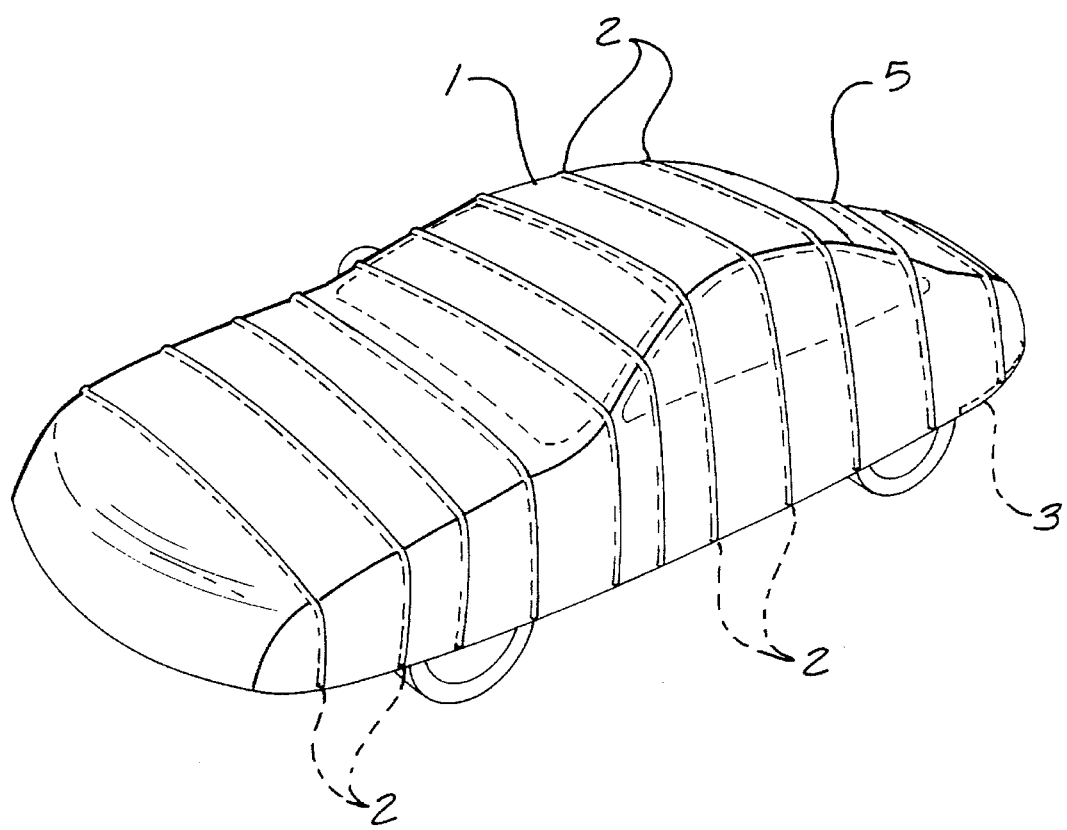
FIG. 1 is a perspective view of a vehicle cover embodiment of the invention positioned on a passenger automobile.

Turning then to the several figures wherein like numerals indicate like parts and more specifically to FIG. 1, a perspective view of the invention positioned on a passenger automobile is shown. Cover 10 is characterized as having integrated therewith a plurality of flexible tubes 20 (their location being coincident with bulges 28). Cover 10 is sufficiently flexible so as to essentially conform to the shape of the object being covered, such as vehicle 40. To facilitate a form fitting covering of vehicle 40, sections of elastic bands 30 are incorporated into cover 10 at selected portions of its perimeter. In preferred form, cover 10 is comprised of two layers, namely an inner layer and an out layer.

Figure 2B:
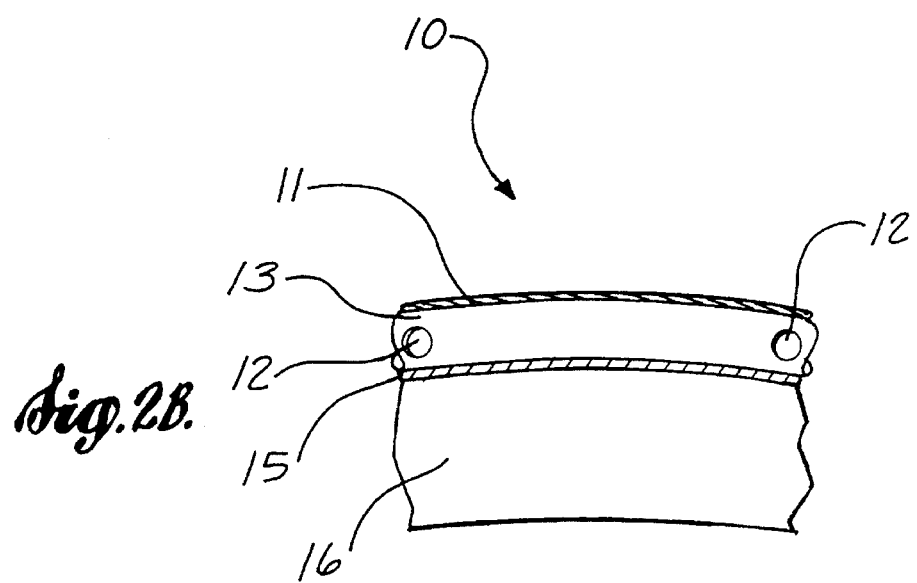
FIG. 2 is an elevational view of the cover of FIG. 1 with the cover shown in partial cross section.
FIG. 2a is an enlarged partial view of the cover shown in FIG. 2.

As better shown in FIG. 2, flexible tubes 20 extend to substantially the longitudinal perimeter portions of cover 10. Thus, flexible tube ends 24 and 26 are exposed to ambient air pressure differentials to permit unrestricted airflow thereinto and therefrom. A plurality of vent holes 22 are formed in each tube 20 such as by drilling. Vent holes 22 permit the bi-directional flow of air into and out of the isolated area bounded by vehicle 40 and the outer layer of cover 10 such as indicated by numeral 42. However, as will be shown, the isolated area also includes any area adjacent to cover 10 and not exposed to ambient conditions.

Figure 2A:
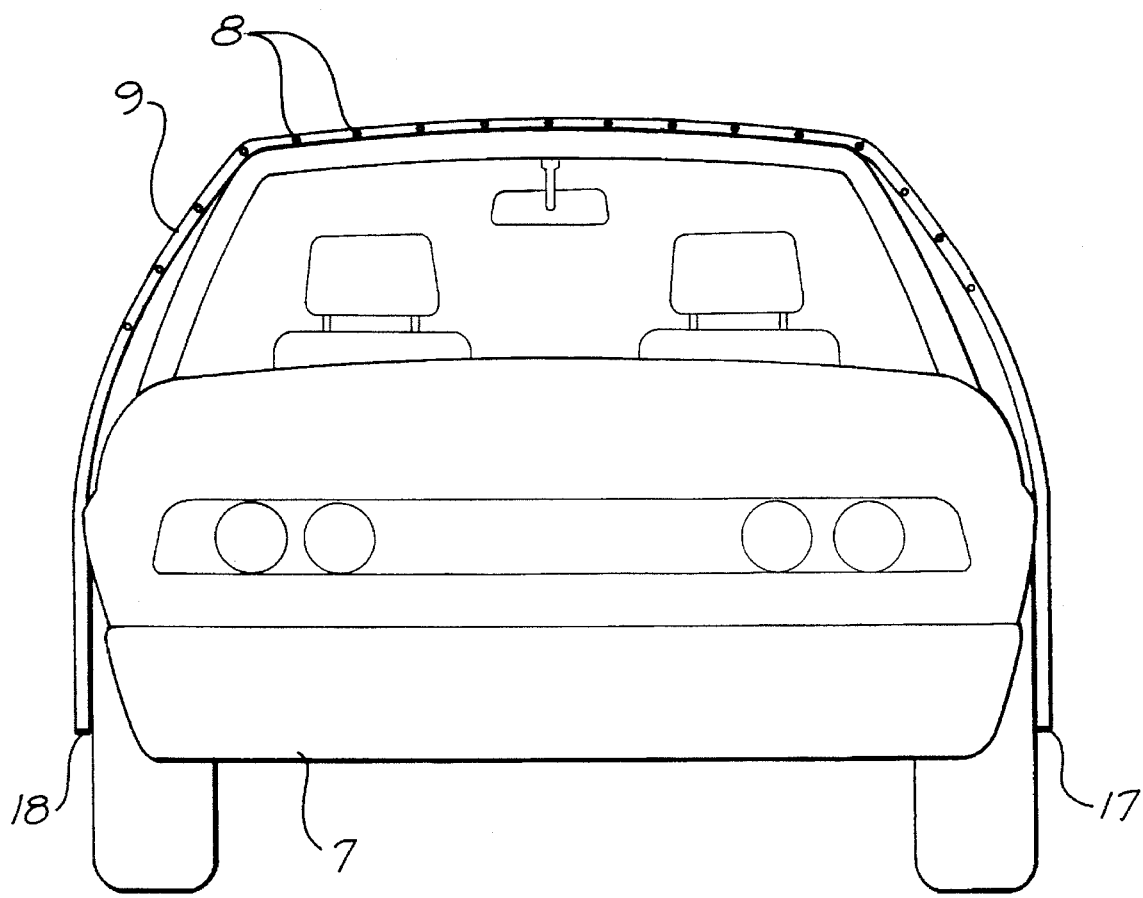

An enlarged view of FIG. 2 is shown in FIG. 2a. In this figure, it can be seen that cover 10 comprises outer layer 12 and inner layer 14. Outer layer 12 is preferably a wholly waterproof and flexible material while inner layer 14 is preferably a highly breathable fabric material. Each tube 20 is disposed between the two afore-mentioned layers. Thus, when cover 10 is resting directly on a surface of an object such as vehicle 40 as shown in FIG. 2a, only inner layer 14 is in contact therewith. In addition, the previously described isolated area is minimized and the air that would otherwise be trapped between outer layer 12 and vehicle 40 is transported therefrom and replaced with new air via vent holes 22 through operation of the barometric air pump as will be described below.

Figure 3:
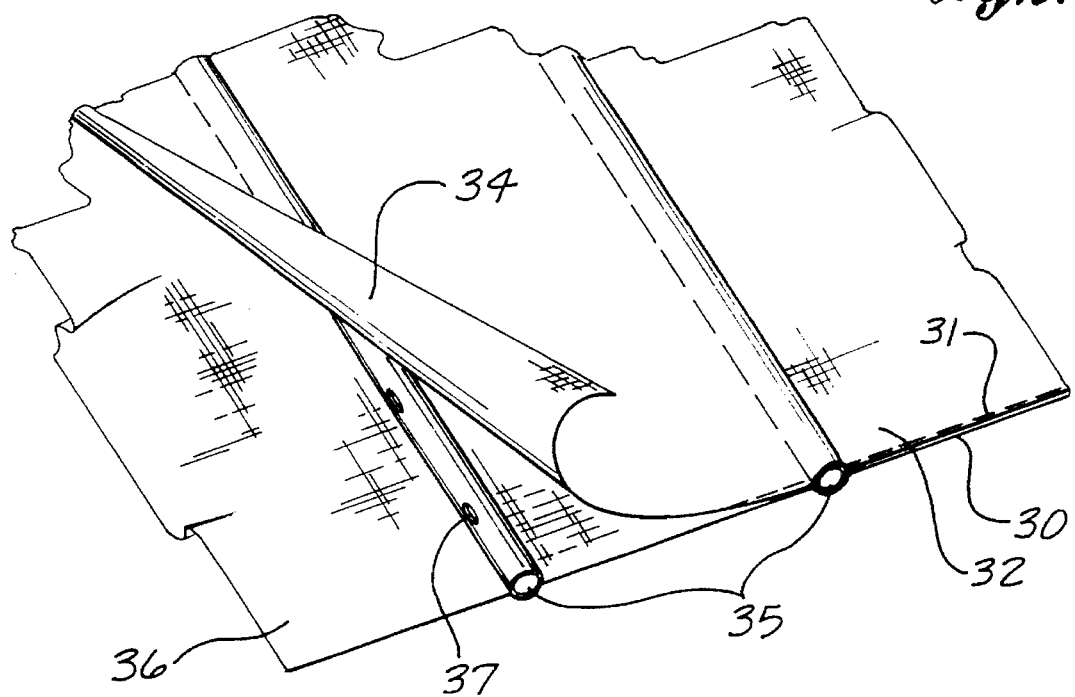
FIG. 3 is an outlay of the cover of FIG. 1 illustrating the position of the flexible tubes and the attachment of the two layers.

The details of the construction of cover 10 is best shown in FIG. 3. As shown, each tube 20 is disposed intermediate outer layer 12 and inner layer 14 in a generally spaced apart manner and preferably parallel fashion. Vent holes 22 are positioned so as to permit air flow from isolated areas into and out of tubes 20. Outer layer 12 is preferably attached to the perimeter of inner layer 14 by means such as stitching 16. Beneficially, stitching 16 positively locates tube ends 24 (and 26 which are not shown in this view) to assist in preventing movement thereof during storage or use of cover 10.

Figure 4A:
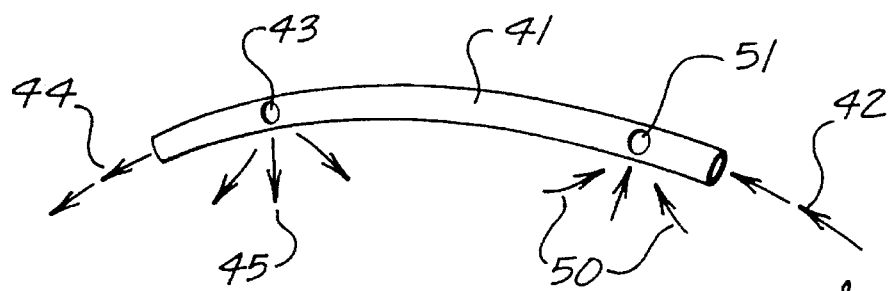
FIG. 4a shows the air flow into and out of a flexible tube when ambient air pressure is greater on a first side.
Figure 4B:
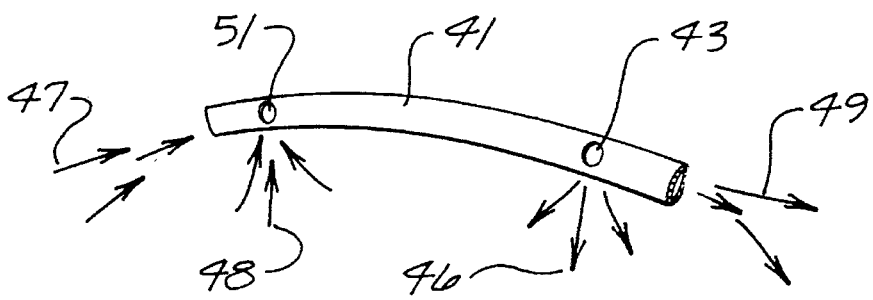

FIGS. 4a and 4b illustrate the air flow through vent holes 22 when the tube ends are subjected to a pressure gradient. For example, in FIG. 4a tube end 24 is presented with a greater ambient air pressure than tube end 26. Consequently, ambient air 52 enters tube end 24 and isolated air 54 enter proximate vent holes 22, and out going air 56 is expelled via tube end 26 and vent holes 22 proximate thereto. Conversely, when tube end 26 is presented with a ambient air pressure greater than tube end 24, the pattern is reversed and ambient air 52 enters tube end 26 and isolated air 54 enter proximate vent holes 22, and out going air 56 is expelled from tube end 24 and vent holes 22 which are proximate thereto.

FIG. 5a shows the placement of a strainer preferably formed to fit internally of each tube end. As shown, strainer 32 has a reduced diameter portion 34 which snugly fits into the internal surface portion of tube end 24 (or tube end 26 as the case may be), and a mesh portion 36. Mesh portion 36 permits air flow therethrough but effectively prevents entry of foreign debris such as insects or rocks which might damage the surface of the covered vehicle or equipment being covered. The generally location of strainer 32 is shown in cross section in FIG. 5b.

Figure 6:
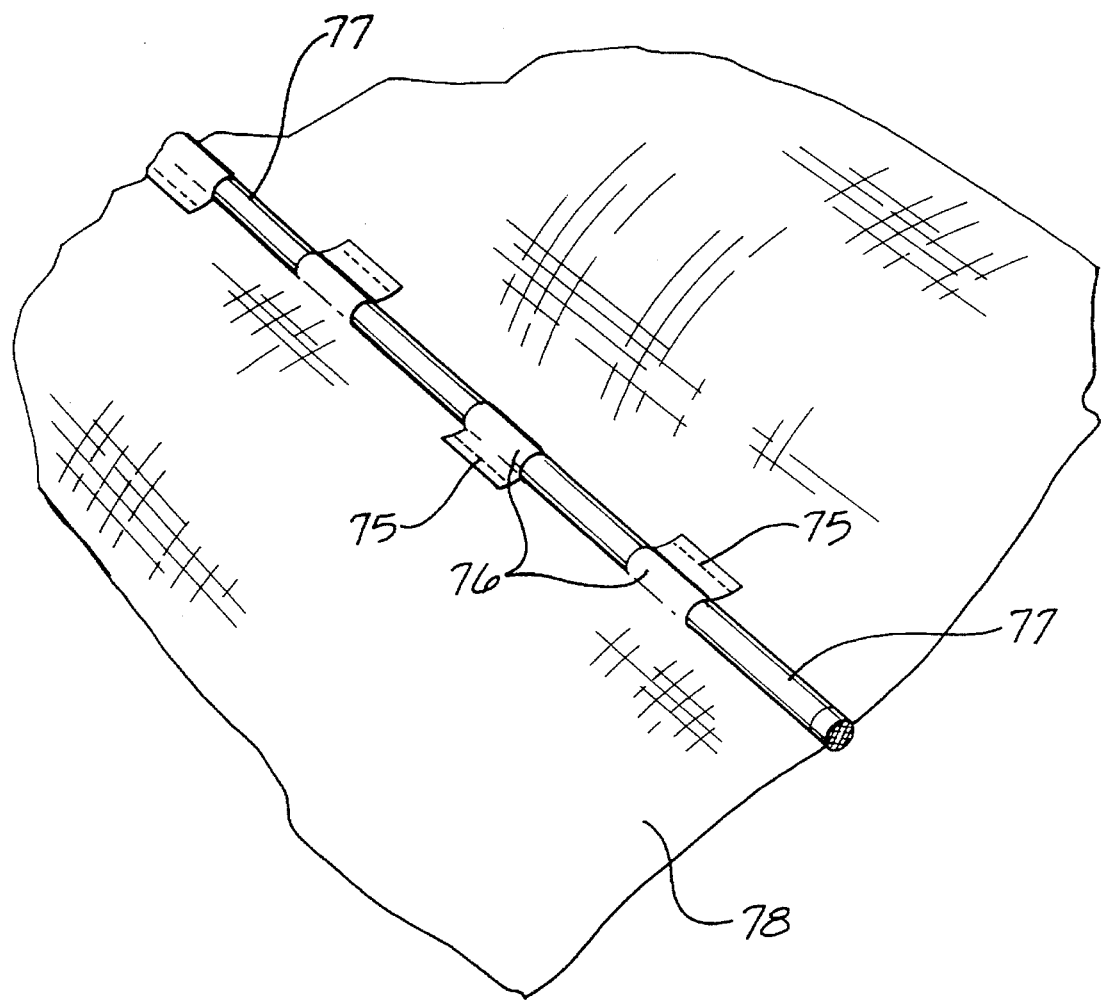
FIG. 6 shows the placement of grommets for securing a flexible tube.

To maintain the essentially parallel, spaced apart relationship of flexible tubes 20 during storage or use of cover 10, a plurality of fastening straps are used as is best shown in FIG. 6. As shown, straps 38 are constructed from generally flexible material and substantially encircle each tube 20. The free ends of each strap 38 are securely fastened to inner layer 14 preferably by stitching 39. In order to maintain proper alignment of each tube 20, the free ends of straps 38 are alternately placed on each side of tube 20 as shown.

During operation, cover 10 is simply placed over the object to be covered and permitted to conform to the shape of the covered object. From then on, pressure differentials between opposing tube ends cause passive movement of air in each flexible tube and consequently, circulation of air within the isolated areas.

What is claimed is:

1. A temporary vehicle and equipment cover comprising:
    a flexible, fluid impervious first layer of material sufficient in size so as to cover substantially all surface area of the vehicle or equipment to be covered;
    a flexible, porous second layer of material sized to generally correspond to the first layer of material and attached thereto at the perimeter of the second layer to create an enclosed void defined by the first layer and the second layer;
    at least one flexible tube, said tube having a first open end and having a plurality of apertures defined thereby, wherein said tube is disposed intermediate the said layers to thereby permit ingress of gaseous fluid from the first end of said tube to the enclosed void and egress of gaseous fluid from the enclosed void to the second end of said tube, whereby placement of the cover over the vehicle or equipment with the first layer exposed to ambient conditions and the second layer proximate to the vehicle or equipment will shelter the vehicle or equipment from ambient conditions yet permit transportation of gaseous fluid into and out of the enclosed void and isolated areas between the outer layer and the vehicle or equipment which is covered.

2. The cover of claim 1 further comprising a plurality of locating straps attached to each flexible tube and fixedly attached to the second layer.

3. The cover of claim 1 further comprising at least one strainer wherein the at least one strainer is located at an open end of a flexible tube to prevent the entry of foreign debris into the tube.

4. The cover of claim 3 wherein the at least one strainer has a screen portion attached to a reduced diameter portion which is sized to fit the internal diameter of the flexible tube so that the screen portion is substantially flush with the tube end when the strainer is inserted thereinto.

5. An apparatus for covering articles comprising:

(a) a flexible, liquid-impervious sheet having an underside and a topside;

(b) a first tube attached to the underside of said sheet, said first tube being flexible to substantially conform to the shape of the article being covered, said first tube having at least one opening beneath the underside of said sheet, said first tube having an external end extending outside said sheet, said external end having an opening to allow the passage of air therethrough; and (c) a flexible porous layer of material attached to the underside of said liquid-impervious sheet, said first tube extending between said liquid-impervious sheet and said porous layer.

6. A cover for protecting equipment, such as vehicles, comprising:

(a) a pliable, waterproof sheet having an underside and a topside, said sheet being formed to include generally vertical walls and a roof portion for substantial enclosure of the equipment; and (b) at least one flexible ventilation tube attached to the underside of said sheet, said tube having a sufficient degree of flexibility to readily conform to the general shape of the equipment covered and to be generally transversely and longitudinally folded with said sheet when not in use on the equipment, said tube extending along at least a portion of the roof portion of said sheet and at least one of said walls, said tube having an opening underneath said sheet and an external end exposed to the outside of said sheet, said external end being open to allow through passage of air surrounding said cover to circulate underneath said sheet as the surrounding air currents cause constant air-drafting off of said external end of said tube for continual vacuum discharge of air and gases from underneath said cover.

7. The cover of claim 6, wherein said tube further includes openings along the length of said tube.

* * * * *